United States Patent [19]

Siviero

[11] Patent Number: 5,807,148
[45] Date of Patent: Sep. 15, 1998

[54] PORTABLE APPARATUS FOR USING BICYCLES AS A TYPE OF WATERCRAFT

[76] Inventor: Roberto Siviero, Via Caprera 11, Vigevano, Italy

[21] Appl. No.: 836,717
[22] PCT Filed: Nov. 7, 1995
[86] PCT No.: PCT/IT95/00180
   § 371 Date: Apr. 30, 1997
   § 102(e) Date: Apr. 30, 1997
[87] PCT Pub. No.: WO96/15026
   PCT Pub. Date: May 23, 1996

[30] Foreign Application Priority Data

Nov. 9, 1994 [IT] Italy .................................. MI94A2271

[51] Int. Cl.[6] ................................................. B63H 21/175
[52] U.S. Cl. ................................................. 440/28; 440/30
[58] Field of Search ...................... 440/11, 12, 21, 440/26–30

[56] References Cited

U.S. PATENT DOCUMENTS 4,789,365  12/1988  Jones ........................................ 440/28
4,936,801  6/1990  Herrit ......................................... 440/12
5,443,405  8/1995  Zeyger ...................................... 440/12

Primary Examiner—Ed L. Swinehart
Attorney, Agent, or Firm—Michael J. Striker

[57] ABSTRACT

A portable apparatus for using a bicycle not only on land but also as a type of watercraft has two oblong connected inflatable floats, a propulsion unit including a propeller and a clutch unit picking up a motion from a tire of a bicycle rearwheel, a rearjoint device for connection between rear parts of the floats and rear upper and lower forks of the bicycle, and a front joint device for connection a front of the floats with a lower bar of a bicycle frame, a quick-coupling clamp to which the clutch unit is fixed and which is securable to a bar of a saddle of the bicycle frame and connected to the propulsion unit by a flexible shaft so that by turning of pedals and therefore a rear wheel of the bicycle, movement is transferred through the flexible shaft to the propulsion unit, an element for connecting the two floats, a element for securing the bicycle, and the propulsion unit being formed so that the apparatus can be stowed inside shoulder packs and rucksacks for easy transport while riding the bicycle or carrying it by hand.

8 Claims, 5 Drawing Sheets

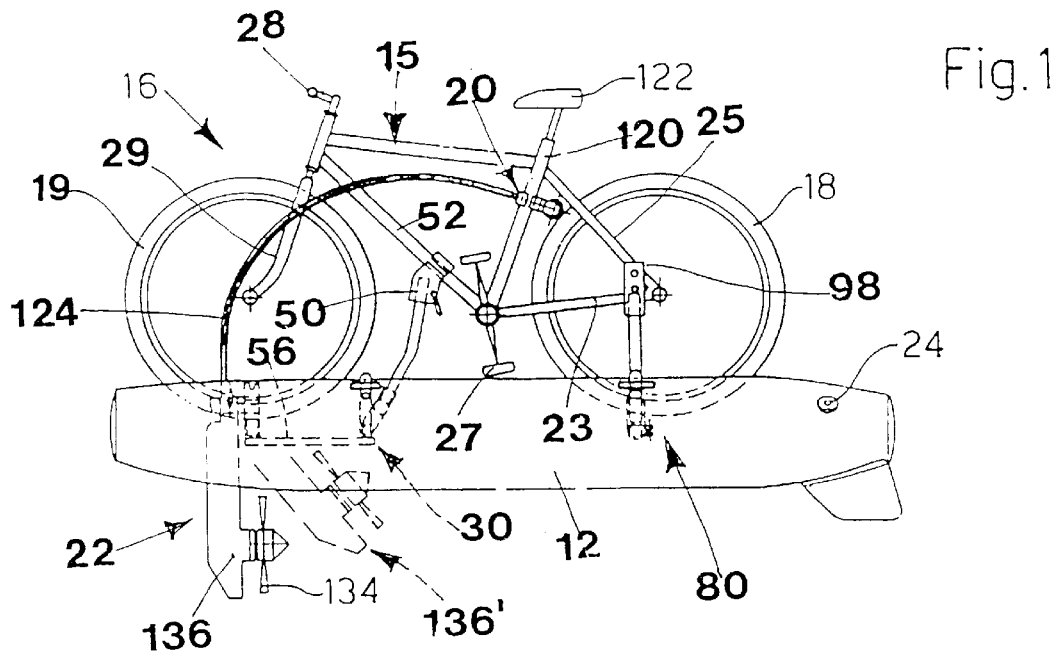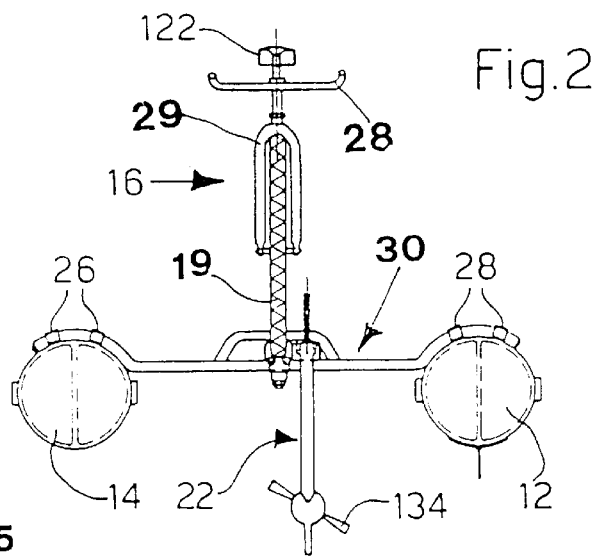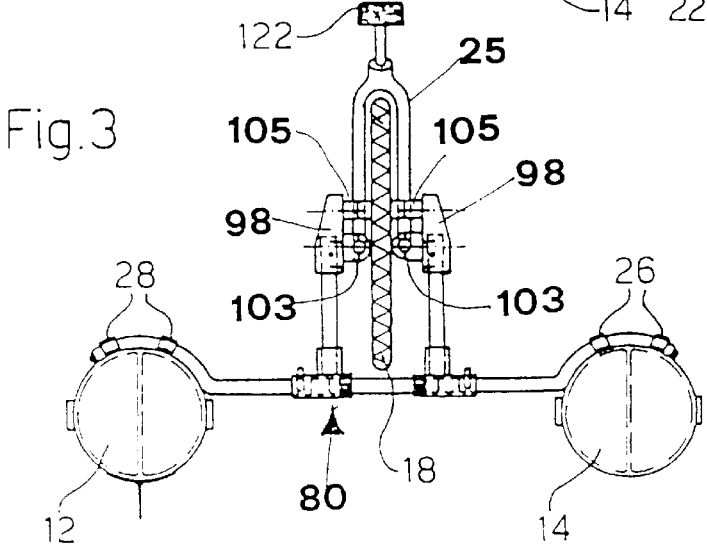

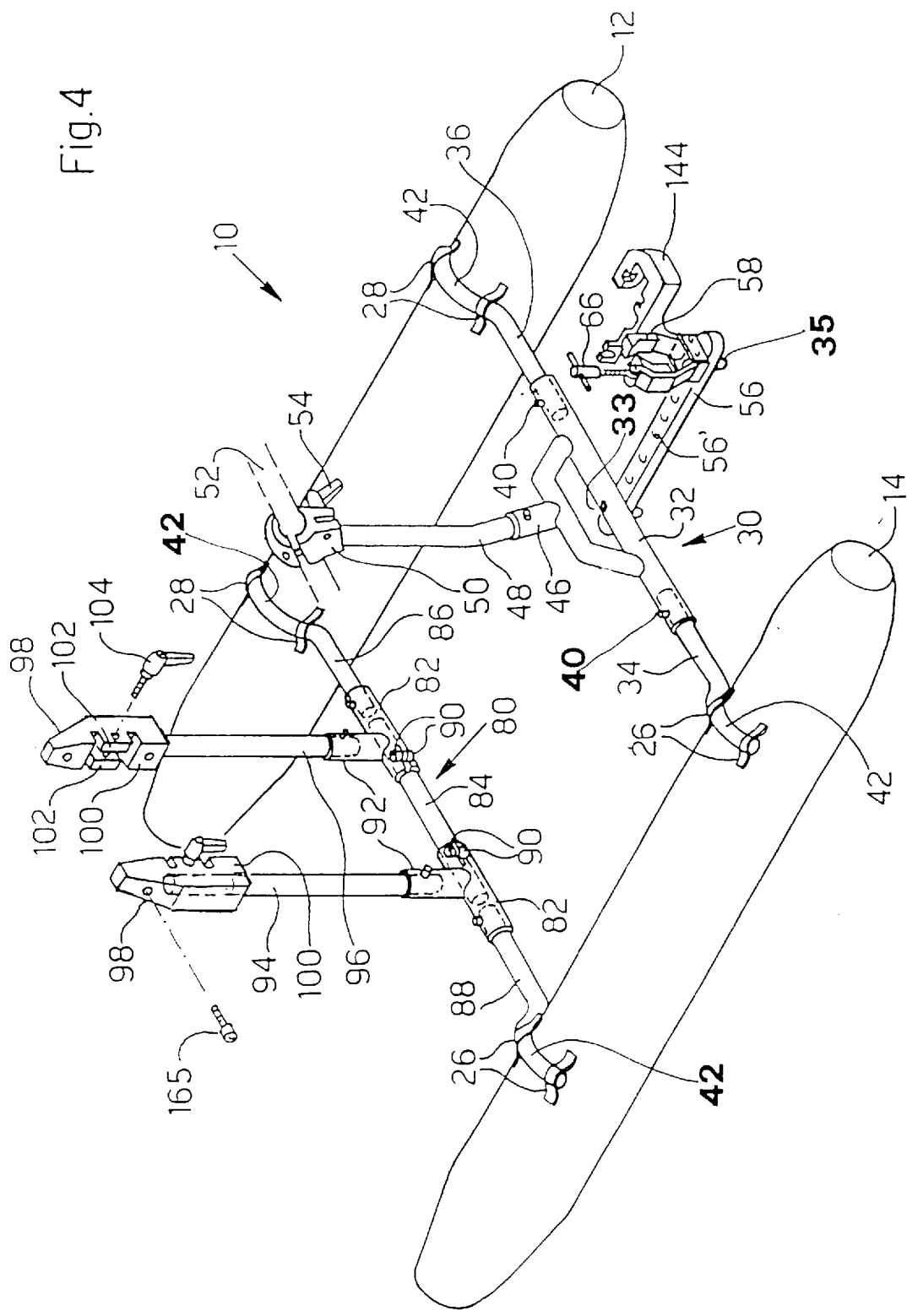

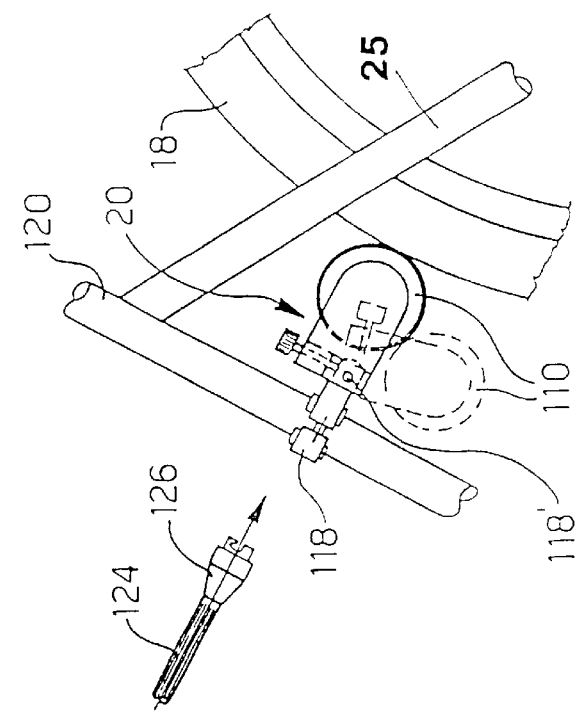
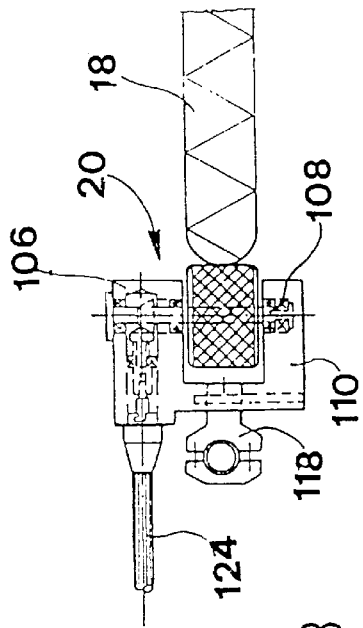
Fig.8
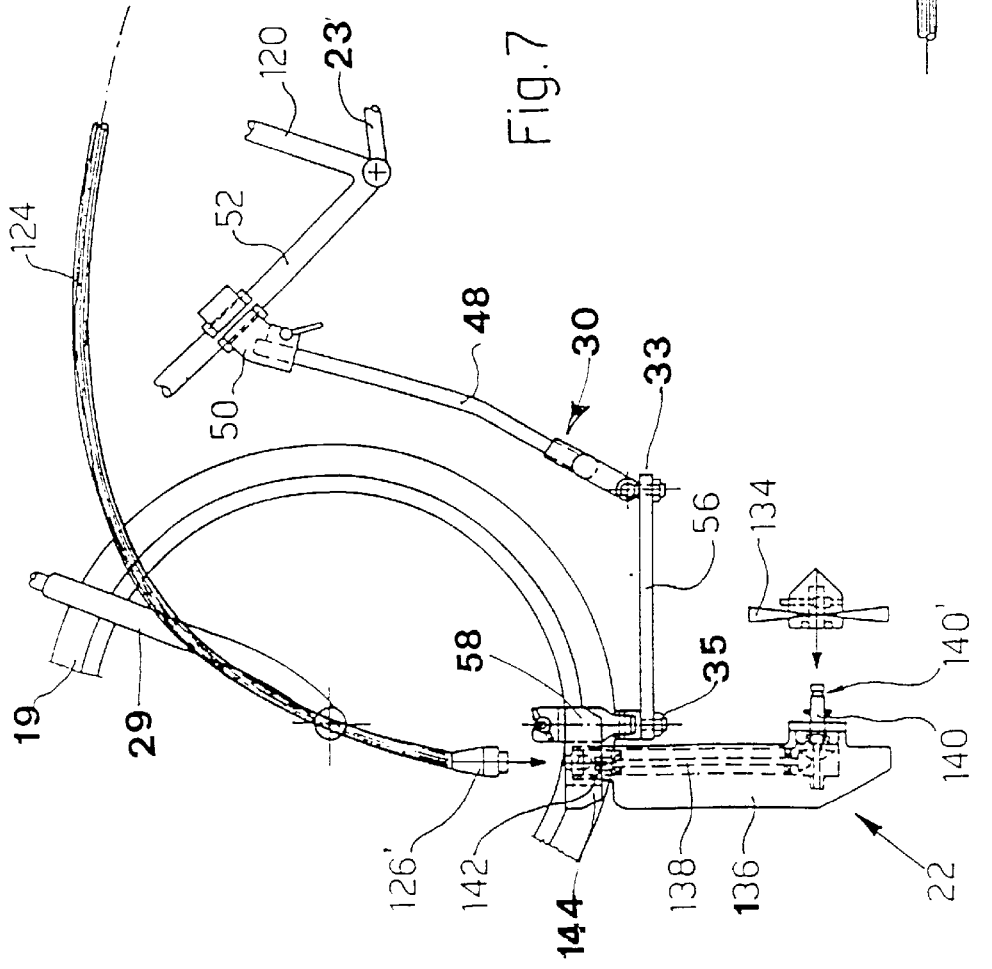
Fig.7

PORTABLE APPARATUS FOR USING BICYCLES AS A TYPE OF WATERCRAFT

BACKGROUND OF THE INVENTION

The present invention concerns amphibious means for making vehicles waterborne.

More particularly, the present invention consists of an apparatus made up of various parts which, assembled, form a floating framework onto which a bicycle can be mounted to become a waterborne vehicle, easy to move and direct even in the presence of currents.

It is a well-known fact that, over time, bicycles have undergone considerable evolution and are available today in a wide variety of types for different purposes. Recently the bicycle has become a favorite means for practicing sport in non-competitive recreational activities. The mountain bike, for example is now highly popular for off-the-road use where conventional models cannot go.

SUMMARY OF THE INVENTION

Purpose of the invention is to make available an apparatus of the kind referred to above, quick and easy to assemble and to mount the bicycle without any changes being necessary in the actual structure of the bicycle. Not least among the purposes of the invention is that of providing an apparatus which, should it not be needed, is light and compact and therefore easy to carry. Yet another purpose is to realize an apparatus that needs no complex technology for its production and so can be made inexpensively.

Subject of the invention is a portable apparatus to make a bicycle waterborne, comprising two oblong inflatable floats of a size sufficient to enable the bicycle, with its supporting apparatus and rider, to keep afloat, means for parallel connection of the pair of floats, means for quickly mounting the bicycle on said means of connection between the floats and means for moving the craft thus created by a propeller-type propulsion unit worked by turning the pedals.

The means for connecting the pair of floats and for quickly mounting the bicycle comprise a device at the back for joining the rear parts of the floats to the upper, lower and rear forks of the bicycle and a device at the front for connection between the forward parts of the floats and the lower bar of the bicycle frame. The rear device for connection comprises a pair of T-shaped joints.

The horizontal sections of said T-joints form two arms with ends so curved as to embrace the upper surface of the floats.

The vertical sections of the T-joints form two parallel columns, standing upright in relation to the floats, at whose upper ends are locking heads with rotatable clamps suitable for rapid attachment to the rear forks of the bicycle.

The front connecting device consists of a T-joint. The horizontal sections of this T as well form two arms also with curved ends to embrace the upper surfaces of the floats.

The vertical arm of the T consists of a central upright standing substantially orthogonal to the floats with an upper clamp for quick attachment to the lower bar of the bicycle frame.

Therefore, having placed the curved ends of the horizontal arms of the rear and front T-joint devices in position on the inflated floats, laid parallel, the bicycle can be mounted on said floats so that, by tightening the rear forks of the bicycle frame in the clamps at the upper ends of the vertical uprights forming part of the back joint device and by tightening the lower inclined bar of the bicycle frame in the clamp at the top of the substantially vertical column in the substantially vertical section of the front T-joint device, a type of watercraft is created. Approximately in the centre of the front T-joint, a horizontal directional bar is fixed by means of a joint with a vertical axis.

At the end of the directional arm is a second joint of rotation whose axis of rotation is orthogonal to said arm, there being at the top of said second joint a clamp made to grip the rim and tyre of the front bicycle wheel, there being fixed to said clamp a means for attachment to pro-peller-type propulsion unit.

The means for moving the propeller-type propulsion unit by rotation of the pedals consists of a clutch that picks up tyre motion off the rear wheel fixed to a quick-coupling clamp that can be secured to the saddle bar of the frame of the bicycle, and from a flexible shaft with two heads at the end for quick coupling to the clutch and to the propeller-type propulsion unit. It follows that by rotating the pedals and therefore the bicycle's rear wheel, tyre motion is transferred by means of the flexible shaft to the propulsion unit. By using the bicycle's; handle bar to rotate the axle of the front fork that supports the front wheel, rotation is determined, by means of the joints between the directional arm and the front joint device and between said directional arm and the clamp for the bicycle's front wheel, around a vertical axis of the propulsion unit which makes it possible for the watercraft to change direction.

The clutch comprises a short shaft on which is fixed a knurled roller projecting outward to make contact with the tyre on the bicycle's back wheel. Connected by a bevel gear to said short shaft is a short orthogonal shaft that can be connected to the flexible shaft.

The propeller propulsion unit comprises an oblong body fixed to the clamp of the rotation joint supported by the end of the directional arm in a downward vertical position. At its lower end is the horizontal propeller shaft.

Said propeller shaft is connected by a bevel gear to an internal shaft axial to the oblong body, and at its upper end is a means of attachment to the flexible shaft. At the two ends of the flexible shaft are quick bayonet type couplings one for the end of the short clutch shaft and one for the short shaft on the propulsion unit. The curved ends of the front and rear joint devices are held firmly to the floats by small heat-welded clamps of rubber, plastic or some other material.

All parts composing the apparatus amount to a few units of simple design, small in size and compact in shape so that they can all be stowed away inside a shoulder pack and the like, easily carried on the bicycle or by hand. At the end of the flexible shaft, to be attached to the propulsion unit, alternatively a socket for a pump can be fitted, the forcing end of said pump being connected to the floats by a flexible tube, while the uprights of the rear joint device fixed to the rear forks of the bicycle, can form a stand which, when placed on the ground, keeps the front wheel raised.

The pump can therefore be worked by pedalling in order to inflate the floats while, by connecting the flexible tube to a suction mouth on the pump, the floats can be rapidly deflated.

Characteristics and purposes of the invention will be made still clearer by the following example of its execution illustrated by diagrammatically drawn figures.

BRIEF DESCRIPTION OF THE DRAWINGS

FIG. 1 The apparatus subject of the invention applied to a bicycle, side view.

FIG. 2 The same as FIG. 1 seen from the front.

FIG. 3 The same as above seen from the back.

FIG. 4 The same as above, in perspective.

FIG. 7 Detail of the clutch unit for picking up rear wheel motion and detail of the propeller propulsion unit applied to the front wheel of the bicycle, joined by a flexible joint, side view.

FIG. 8 Detail of the clutch, seen from the side.

DESCRIPTION OF PREFERRED EMBODIMENTS

Figure 5:
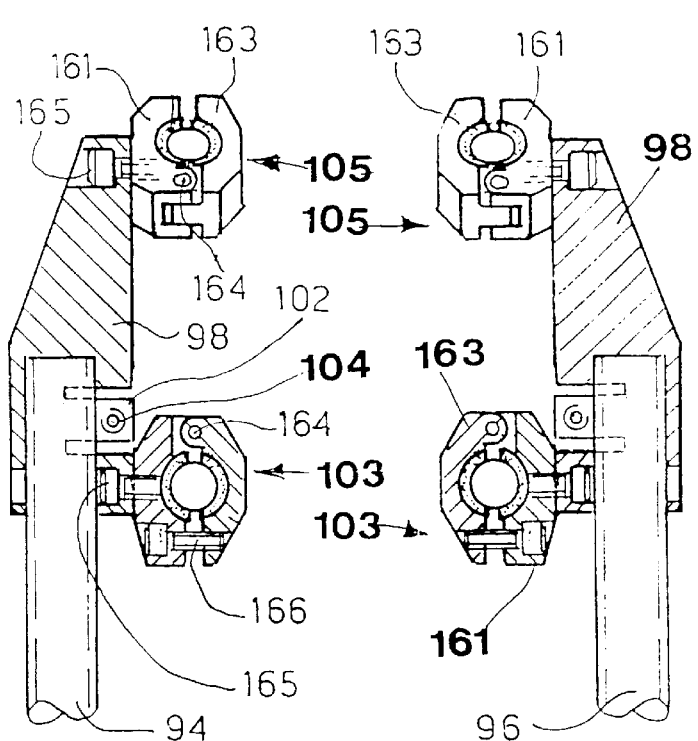
FIG. 5 Detail of attachment to the forks,front perspective.
Figure 6:
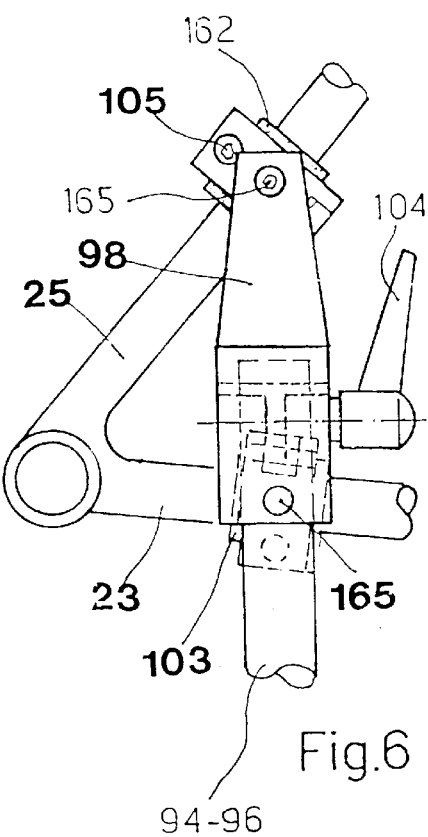
FIG. 6 The same as above, side view.

The apparatus subject of the invention comprises two inflatable floats 12,14, two devices 30,80 for containing them to the bicycle 16 and a clutch 20 for transmission of motion from the rear wheel 18 to the propulsion unit 22 placed below the front wheel 19 of said bicycle. Said floats 12, 14 are formed of substantially cylindrical bodies, slightly tapered at the front and back ends,made of plastic material and fitted with valves 24 through which to inflate them.

Two pairs of half-ring shaped clamps 26,28 are fixed transversally to said floats, said clamps forming seats for receiving and locking in place the ends of tubular metal arms 34,36,86,88.

Said clamps, of plastic or rubber, are applied by heat welding or equivalent systems. Said metal arms are made of aluminium, stainless steel or some other suitable material.

The front connecting device 30 is formed of a T-shaped joint 32 and of the metal arms 34,36 referred to above fitted in by pressure into the horizontal ends of the T to which they are fixed by pawls 40.

At the respective ends 42 of said tubular arms 34,36 is an arched configuration, complementary to the concavity of the inflatable floats 12, 14 to which they adhere when inserted in the pairs of half-ring shaped clamps 26,28. In the vertical section 46 of the T-joint 32, the lower end of an upright 48 is pressed in, there being at its end a clamp 50 which by means of a lever 54 fixes onto the inclined bar 52 of the frame 15 of the bicycle 16. Substantially in the middle of the T-joint 32, a directional arm 56 is fixed by means of a rotation joint 33 with a vertical axis, said arm extending toward the front of the inflatable floats 12,14.

Figure 10:
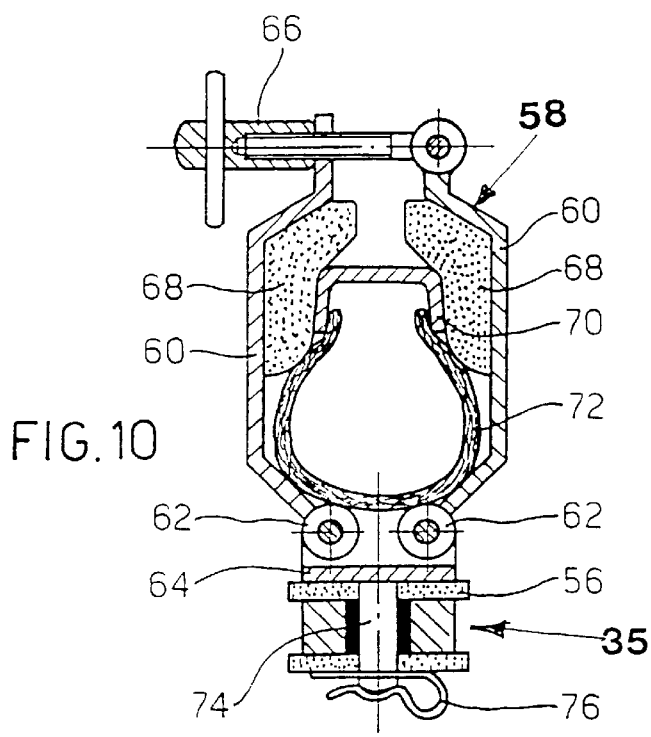
FIG. 10 Detail of the clamps for locking the front wheel.

In said arm 56 are a number of holes 56' for receiving a joint 35 with a vertical axis, and a clamp 58 to lock onto the front wheel 19 of the bicycle 16. Said clamp 58 (FIG.10) is formed of a pair of jaws 60 joined together low down with articulations 62, to a plate 64, there being at the top an adjustable locking rod 66.

On the opposing internal walls of said clamp are shaped pads 68 of synthetic foam and these adhere to the rim 70 of the tyre 72 on the bicycle's front wheel 19. A pin 74 is fixed to the plate 64 of the clamp 58, said pin fitting into one of the holes 56' passing through the directional arm 56 and projecting downward from it so that it can rotate freely, held by a split pin 76 or the like.

The joint device 80 that connects the inflatable floats 12,14 at the back, is formed of a pair of T-joints 82, a central tubular part 84 and two metal arms 86,88 with curved ends 42 substantially the same as the arms 34,36 of the front joint device 30 already described, that can adapt their shape and adhere to the convexity of the inflatable floats 12,14.

The arms 86,88 are connected to the T-joints 82 by means of elastic pawls placed at holes, while the tubular part 84 is pressed down into the counterposed heads of said joints, in which heads are clefts and overlying eyeholes 90 into which bolts are passed for tightening.

The vertical section 92 of each T-joint forms the seat into which the tubular uprights 94,96 are pressed, at the upper ends of which are locking heads 98 with clamps 103,105 which, by means already known, can be stably fixed to both sides of the rear lower 23 and upper 25 forks of the bicycle.

Said clamps 103 and 105 are fixed to the locking heads 98 by headed pins 165.

Each clamp comprises jaws 161–163 articulated by the pin 164 and which can be locked in position by bolts 166. The pins 165 enable the clamps to rotate freely to suit the angles of the rear forks of the bicycle. Said locking heads 98 exhibit a hole that passes through their lower part 100 and into which the tubular uprights 94,96 are pressed.

On said heads are two opposing fins 102 perforated transversely and that can be tightened together by a screw 104 with handgrip.

The clutch unit 20 (FIG.8) consists of a metal case 106 with shaft 108 onto which a knurled roller 110 is fitted. Said roller 110, that projects from the rear of the clutch 20 to make contact with the tyre of the rear wheel 18, is connected by a bevel gear 112 to another shaft 114 orthogonal to the previous one.

Fixed to the front of the clutch is a clamp with jaws 118 with an articulation 118' at the end for securing it to the bar 120 of the bicycle's saddle 122. By means of the articulation 118' the clutch 20 can be rotated downwards as shown by the dotted line in FIG. 7, to detach the knurled roller 110 from the rear wheel 18.

One end of the flexible shaft 124 can be fitted into the end of the shaft 114.

Figure 9:
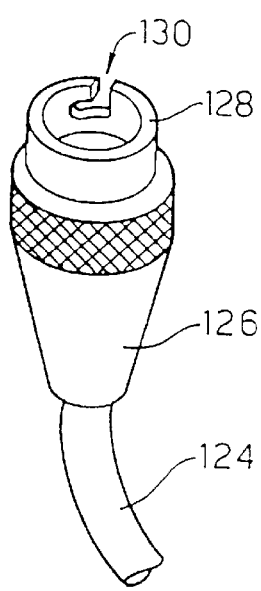
FIG. 9 Perspective view of the end of the flexible shaft.

Said end is formed of a cap 126 in which, along the periphery of the end collar 128 is an L-shaped cut 130 (FIG. 9).

The flexible shaft extends towards the front wheel 19 of the bicycle 16 to fit into the propulsion unit 22 at whose lower end is a propeller 134.

The propulsion unit 22 consists of a metal case 136 which is sealed and which incorporates two short shafts 138, 140 orthogonal one to the other, the second projecting outwards for application of the propeller.

Uppermost in the propulsion unit 22 is a seat 142 made to receive one end of the flexible shaft 124, fitted with a cap 126'.

Said propulsion unit 22 can be inserted into a substantially U-shaped part fixed to one side of the clamp 58 and able to hold firm the front wheel 19 of the bicycle 16, and extends below the floats 12,14 orthogonally in relation to said floats.

The propeller 134 of said propulsion unit 22 is served by a quick coupling 140' formed of an extension of the short shaft 140.

Figure 11:
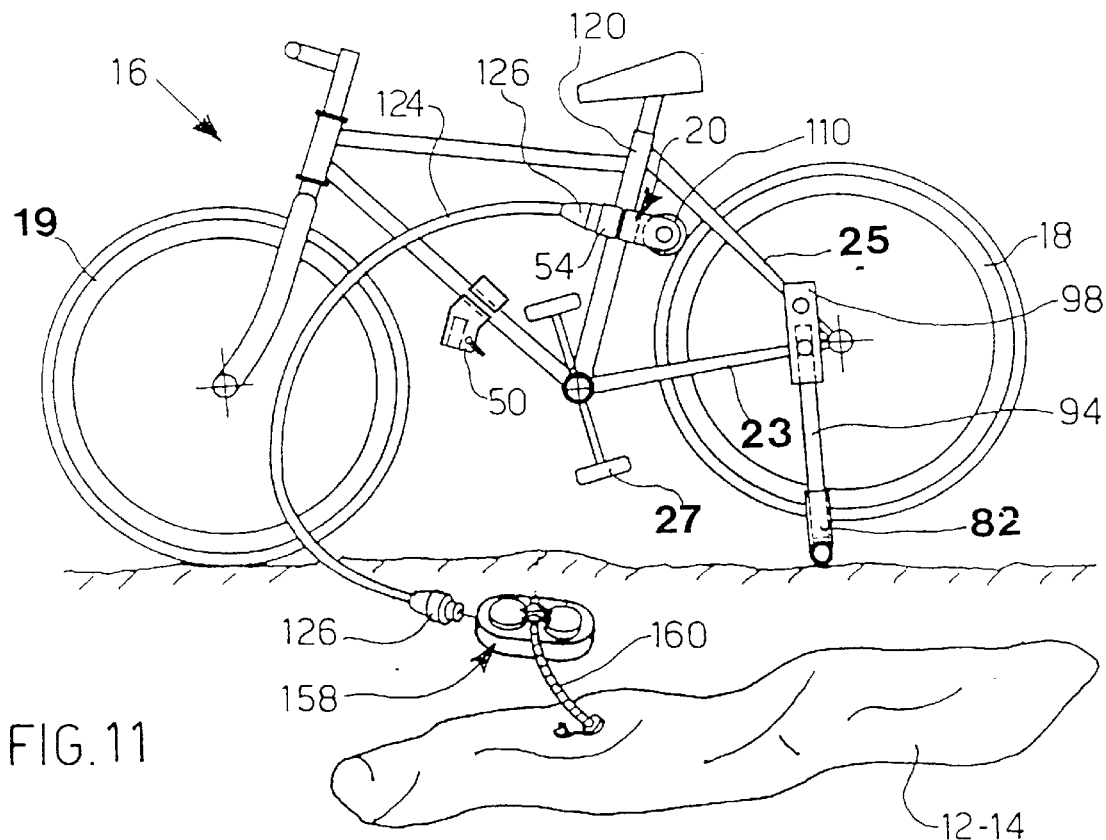
FIG. 11 Bicycle standing on the ground supported by a part of the apparatus, the flexible shaft being connected between the clutch applied to the rear wheel, raised from the ground, and a pump for inflating the floats, perspective view.
Figure 12:
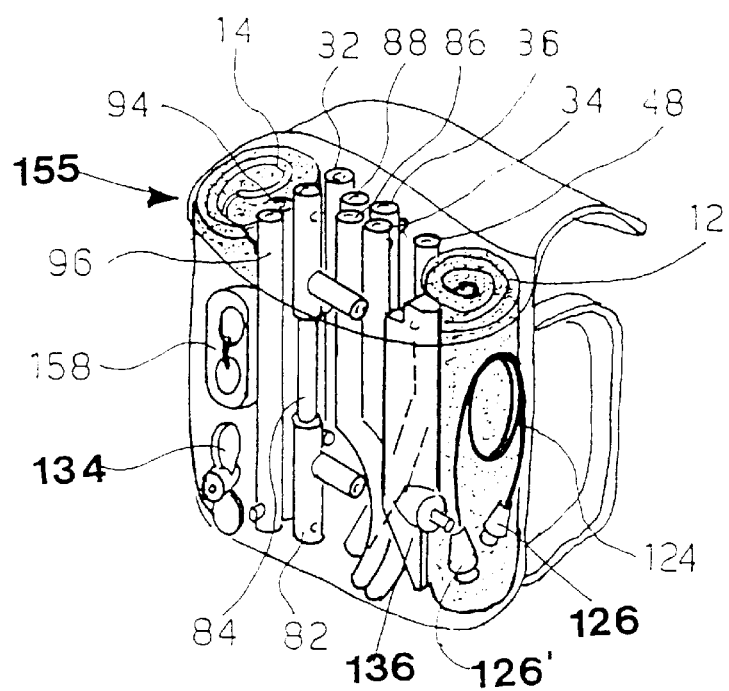
FIG.12 Shoulder pack for containing the apparatus.

FIG. 11 illustrates a stage in mounting the invented apparatus and concerns in particular inflation of the floats 12,14 by using the flexible shaft 124.

Part of the rear joint device 80 is connected to the bicycle 16, said part being limited to the T-shaped tubes 82, to the intermediate tube 84 and to the clamps 103, 105, so forming a stable stand for the bicycle 16 and raising the rear wheel 18 slightly above ground level. The flexible shaft 124 is connected, at one end, the clutch unit 20 and, at the other end, to a pump 158, in turn connected to one of the inflatable floats 12,14 by a flexible tube 160.

By turning the bicycle pedals 27 the rider can then easily work the pump 158 and quickly inflate the floats.

The pump 158 can of course be given a suction duct for the short tube 160 so as to draw out the air in the floats 12,14 and quickly deflate them.

The invention offers evident advantages.

The apparatus described is extremely easy to assemble, disassemble and carry, practical to use while keeping the bicycle mounted on it under full control.

Of special advantage is the use parts for transmitting motion to pump up the floats or completely deflate them. The floats can obviously be made with two or more separate compartments, including valves for inflation, can also have one or more directional fins low down on the front, be given protective means at the sides, handles for holding them, and other devices.

Further possibilities could include structural reversal or alternative positioning of components or parts that make up the apparatus subject of the invention.

I claim:

1. A portable apparatus for using a bicycle not only on land but also as a type of watercraft, comprising two oblong inflatable floats; means for connecting said floats with one another; means for securing a bicycle to said means for connecting between said floats; means for driving the apparatus with a propulsion unit including a propeller and a clutch unit picking up a motion from a tire of a bicycle rear wheel, said means for connecting said floats and for securing the bicycle including a rear joint device for connection between rear parts of said floats and rear upper and lower forks of the bicycle, and a front joint device for connection a front of said floats with a lower bar of a bicycle frame, a horizontal directional arm fixed by a vertical rotation joint to said front joint device, a second vertical rotation joint provided at an end of said arm with a clamp arranged at a top of said joint to feed onto a rim with a tire of a front wheel of the bicycle, a connecting element fixed to said clamp for a propulsion unit with said propeller, a quick-coupling clamp to which said clutch unit is fixed and which is securable to a bar of a saddle of the bicycle frame and connected to said propulsion unit by a flexible shaft with two heads one at each end so that by turning of pedals and therefore a rear wheel of the bicycle, movement is transferred through said flexible shaft to said propulsion unit, while at the same time using a bicycle handlebar to rotate an axis of a front fork that supports the front wheel a rotation of said propulsion unit using the handlebar is determined through said rotation joints between said front joint device and said directional arm and between said arm and said clamp for the front wheel of the bicycle, to make the watercraft change direction as desired, said means for connecting said two floats, said means for securing the bicycle, and said means for driving being formed so that the apparatus is stowable inside shoulder packs and rucksacks for easy transport while riding the bicycle or carrying it by hand.

2. An apparatus as defined in claim 1, wherein said rear joint device includes a pair of T-shaped joints having horizontal sections which form two arms with a half-ring shaped end adhering to an upper surface of said floats, and a vertical section forming two parallel uprights orthogonal to said floats with heads to support rotatable clamps at a top for quick-coupling with rear forks of the bicycle, said front device including a T-joint with two horizontal arms having ends shaped as half-rings matched at a top of said floats and a vertical arm forming a central upright extending substantially orthogonal to said floats and having an upper clamp for quick coupling by a lever on a lower bar of the bicycle frame, so that by connecting said half-ring ends of said horizontal arms of said T-joint in said rear and front joint devices to said floats when said floats are inflated and placed parallel, the bicycle is secured to said floats and by tightening inside said clamps fixed to said upper ends of said uprights of said rear joint device, the front forks of the bicycle frame and then tightening a clamp fixed to said central upright of said front joint device onto a lower inclined bar of the bicycle, a watercraft is created.

3. An apparatus as defined in claim 2; and further comprising heat-welded pairs of clamps which secure said half-ring-shaped ends of said arms of said joining devices to said floats.

4. An apparatus as defined in claim 3, wherein said heat-welded pairs of clamps are composed of a material selected from the group consisting of rubber and plastic.

5. An apparatus as defined in claim 1, wherein said clutch unit includes a short shaft carrying a knurled roller that projects from said clutch unit so as to make contact with the tire of the back wheel of the bicycle, wherein said shaft being connected by a bevel gear to another orthogonal shaft which is connectable to said flexible shaft.

6. An apparatus as defined in claim 1, wherein said propulsion unit includes an oblong body attachable vertically and downwards to a U-shaped part fixed to said clamp on said second vertical rotation joint with a horizontal shaft of said propeller arranged at a lower end, said shaft being connected by a bevel gear to an axial shaft of said oblong body and provided on an upper end with means for securing to said flexible shaft.

7. An apparatus as defined in claim 1, wherein said flexible shaft has ends provided with quick couplings of a bayonet type fittable to ends of a shaft in said clutch unit and of a shaft of said propulsion unit.

8. An apparatus as defined in claim 2, wherein said flexible shaft has an end provided with an alternative feeding mountable for a pump whose forcing mouth connects with said floats by a short flexible tube, while said uprights of said rear joint fixed to the rear forks of the vehicle form a stand which when placed on the ground keeps the rear wheel of the bicycle raised above the ground after which on turning of the pedals of the bicycle said pump can be operated for inflating said floats, while by connecting said flexible tube to a suction mouth of said pump, said float can be quickly deflated.

* * * * *